United States Patent [19]

Sato et al.

[11] Patent Number: 5,697,712
[45] Date of Patent: Dec. 16, 1997

[54] IMAGE PROCESSING METHOD AND APPARATUS

[75] Inventors: Takashi Sato, Yokohama; Hitomi Hanyu; Yoshiaki Hanyu, both of Souka; Naofumi Ueda, Yokohama, all of Japan

[73] Assignee: Ricoh Company, Ltd., Tokyo, Japan

[21] Appl. No.: 480,937

[22] Filed: Jun. 7, 1995

Related U.S. Application Data

[63] Continuation of Ser. No. 995,173, Dec. 24, 1992, abandoned.

[30] Foreign Application Priority Data

| Dec. 26, 1991 | [JP] | Japan | 3-357936 |
| Jan. 31, 1992 | [JP] | Japan | 4-046048 |
| Nov. 2, 1992 | [JP] | Japan | 4-317813 |

[51] Int. Cl.⁶ ............................................. B41J 2/36
[52] U.S. Cl. .................................. 400/120.07; 347/183
[58] Field of Search ................. 400/120.01, 120.07; 346/76 PH; 395/128; 347/183

[56] References Cited

U.S. PATENT DOCUMENTS

| 5,210,545 | 5/1993 | Tomita | 346/107 R |
| 5,241,324 | 8/1993 | Tamura | 346/107 R |
| 5,396,584 | 3/1995 | Lee et al. | 395/128 |

FOREIGN PATENT DOCUMENTS

| 60-49314 | 1/1985 | Japan | 400/83 |

*Primary Examiner*—Edgar S. Burr
*Assistant Examiner*—Steven S. Kelly
*Attorney, Agent, or Firm*—Lowe, Price, LeBlanc & Becker

[57] ABSTRACT

A method and apparatus proecsses a dot image formed of a plurality dots, each dot having a density level. In the method and appratus, a dot pattern is extracted from the dot image, which dot pattern being formed of an observation dot and dots surrounding the observation dot, it is tdetermining, based on comparison between the extracted dot pattern and predetermined reference patterns, whether or not the observation dot in the dot pattern is either a dropout dot or a projection dot, a density level of the observation dot is changed to a first density level corresponding to the dropout dot when it is determined that the observation dot is the dropout dot, and a density level of the observation dot is changed to a second density level corresponding to the projection dot when it is determined that the observation dot is the projection dot.

2 Claims, 23 Drawing Sheets

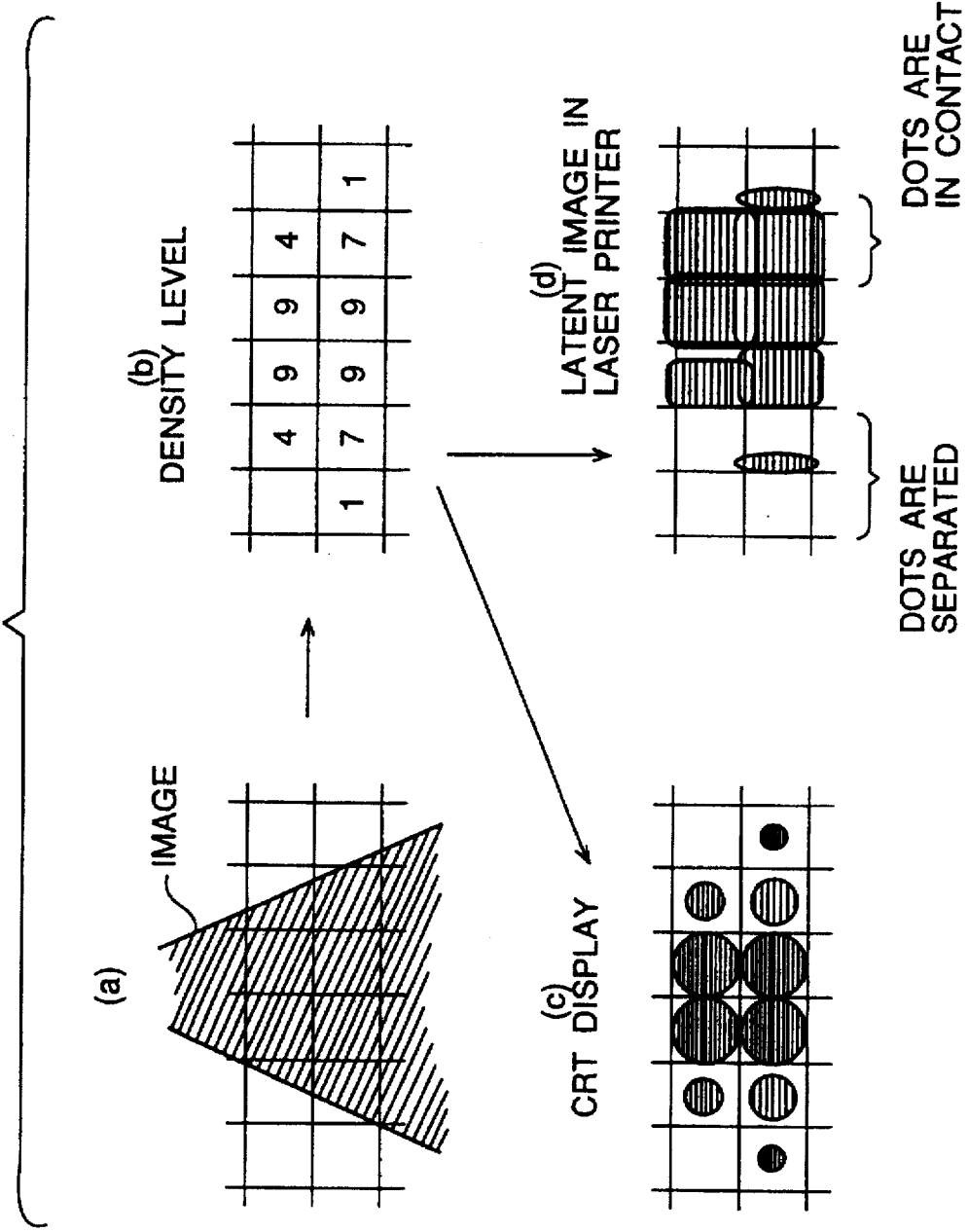

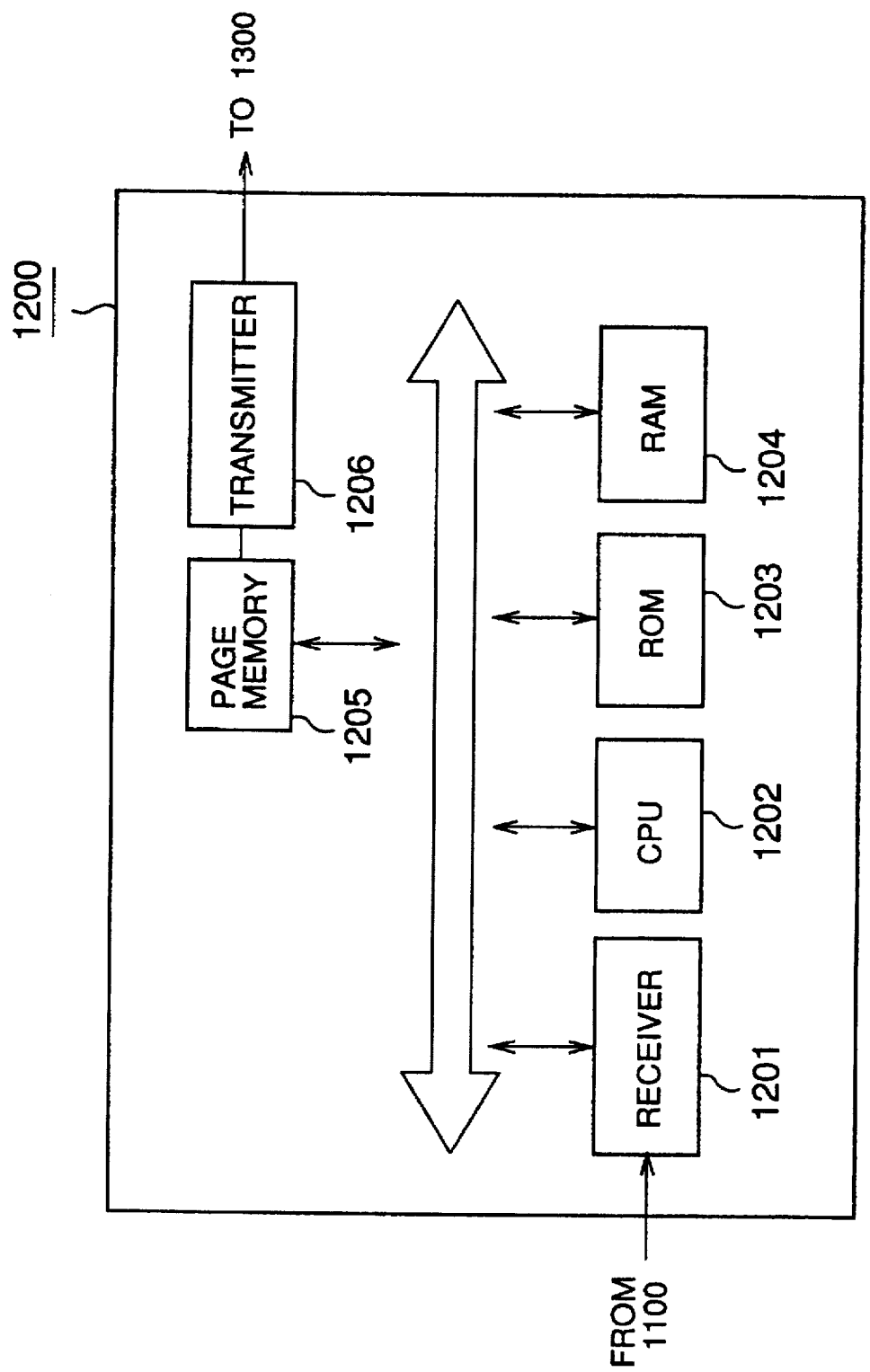

| (1) (2) (3) | D5 D4 | |
|---|---|---|
| H L L | 0 0 | : LEFT SIDE PHASE |
| L L H | 1 0 | : RIGHT SIDE PHASE |
| H L H | 0 1 | : CENTRAL PHASE |

FIG.16A
| 0  | 14 | 15 | 0 |
|----|----|----|---|
| 0  | 3  | 15 | 6 |
| 2  | 8  | 14 | 0 |
| 10 | 0  | 0  | 0 |
FIG.16B
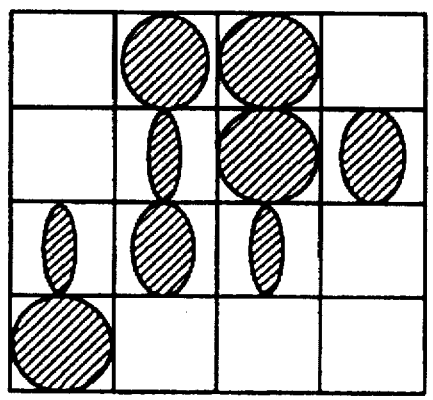
FIG.16C
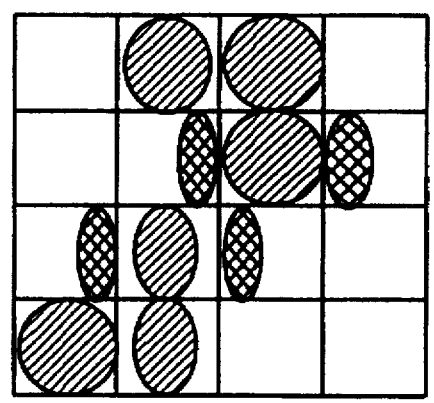
PHASE CONTROL

HALF TONE IMAGE $H = max/2, L = max/2$ $max \cdot 2/5$   $max \cdot 3/5$ $H = max \cdot 2/3, L = max/3$ H = max / 2, L = max / 2

H = max · 2/ 3, L = max / 3 max · 2 / 5 max · 3/ 5

IMAGE PROCESSING METHOD AND APPARATUS

This is a continuation of U.S. patent application Ser. No. 07/995,173, filed Dec. 24, 1992, now abandoned.

BACKGROUND OF THE INVENTION

(1) Field of the Invention

The present invention generally relates to an image processing method and apparatus, and more particularly to an image processing method and apparatus in which jagged edges of dot output images are made look as smooth as possible.

(2) Description of Related Art

It is generally difficult to make jagged edges of images, represented by dot-matrix, smooth. In particular, when binary image data is output (e.g. printed and/or displayed) at a low resolution, edges of the output image appears to be remarkably jagged so that the output image is not clear-cut. Thus, to improve a quality of printed and/or displayed image, "CORRECTION SYSTEM FOR CHARACTER PATTERN", as disclosed in Japanese Patent Publication No. 60-49314, has been proposed.

In the above disclosed method, dotted images are read by a scanner or are obtained by enlarged/reduce processing, and dropout and projection of dots are detected in the dotted images by a pattern matching process using predetermined reference patterns. With respect to the detected dropout and projection of the dots, correction signals are generated. Image data corresponding to the dropout and projection dots is inverted based on the correction signals. As a result, dropout and projection of dots are removed from the dotted images, so that quality of the dotted images (character images) are improved.

However, in this conventional image processing method, as the dropout and projection of dots are detected by the pattern matching process using the reference patterns, dropout and projection of dots included in other various image patterns are not detected. Thus, the above conventional image processing system is not used for making edge lines of dotted images look smooth.

In addition, in a field of computer graphics, to make images displayed on a CRT display unit look as beautiful as possible, an image processing referred to as an antialiasing process is applied to dotted image data. In this antialiasing process, a brilliance modulation is applied to a jagged part (named as an aliase) of each edge of a dotted image as shown in FIG. 1A, so that each edge of the dotted image is made to look smooth as shown in FIG. 1B.

A system in which vector image data, as treated in the field of the computer graphics, is printed has been proposed with development of a DTP (Desktop Publishing) system. A system using a language named "Post Script" has been, for example, proposed by Adbe Systems, Inc. The "Post Script" is a type of Page Description Language (PDL), and is a programming language for describing a text (characters), graphics, arrangement thereof and the like in one document. In this type of system, vector fonts are used as fonts for representing characters, so that the quality of the printed image of characters can be improved. Furthermore, there is an advantage in that font characters represented by fonts, graphics and images are printed on one printed sheet in mixture.

In this conventional system, as a resolution of an image output unit such as a laser printer is in the rage of 240 dpi (dot par inch)–400 dpi at most, edges of printed character images are jagged in the same manner as computer graphics displayed in the CRT display unit. Thus, to improve the quality of printed character images, the antialiasing process must be applied to the printed character images. In the laser printer, the density of each dot may be generally controlled by controlling a power level of the laser and by controlling a pulse width of a driving signal of the laser. The former is referred to as a power modulation, and the later is referred to as a pulse width modulation.

However, in the laser printer in which the density of each dot is controlled in accordance with the pulse width modulation, the antialiasing process must be carried out by use of the pulse width modulation only substituted for the brilliance modulation in a case where the computer graphics are displayed on the CRT display unit. In a case where the pulse width modulation is used in the antialiasing process as it is, the quality of printed character images is not always improved due to an electrophotographic process carried out in the laser printer, as shown in FIG. 2.

Referring to FIG. 2, the antialiasing process is applied to a vector image as indicated in (a) so that an gradational level (in a range of 0–9 levels) for each dot is calculated as indicated in (b). When the brilliance modulation is carried out based on the gradational levels for dots of the image, a dotted image as indicated in (c) is displayed on the CRT display unit. In this case, edges of the image displayed on the CRT display unit can be made look smooth. On the other hand, when the pulse width modulation is carried out based on the gradational levels for dots of the image in the laser printer, a dotted latent image as shown in (d) is formed on a photosensitive medium. In the dotted latent image shown in (d) of FIG. 2, although a dot having a low gradational level (a small dot) and positioned at a right edge of the image is in contact with the image, a dot having a low gradational level (a small dot) and positioned at a left edge of the image is separated from the image. This phenomenon occurs based on the following reason.

In the pulse width modulation, a time for which the laser element is turned on in accordance with the gradational level. The higher the gradational level, the longer the time for which the laser element is turned on. A laser beam spot moves on the photosensitive medium from an initial point, at which the laser beam is initially projected, for the time corresponding to the gradational level, so that a dot extending from the initial point by an amount corresponding to the gradational level is formed on the photosensitive medium. Thus, a small dot corresponding to a low gradational level is separated from the initial point (a left end of each dot) of the adjacent dot, as shown in (d) of FIG. 2.

That is, the laser printer, in which the density of each dot is represented in accordance with the pulse width modulation, cannot satisfactorily represent dots having low gradational levels obtained by the antialiasing process. In particular, when small dots are separated from an edge of the image, the edge of the image can be further jagged.

In addition, it is difficult for the laser printer in which an image is formed in accordance with the electrophotographic process to print dots separated from other dots. Thus, in a case where dots having low gradational levels are positioned at an edge of the image, the dots having low gradational levels is not printed, so that the printed image is thin.

SUMMARY OF THE INVENTION

Accordingly, a general object of the present invention is to provide a novel and useful image processing method and apparatus in which the disadvantages of the aforementioned prior art are eliminated.

A more specific object of the present invention is to provide an image processing method and apparatus in which jagged edges of images can be made look as smooth as possible and the quality of the image is improved.

The above objects of the present invention are achieved by a method for processing a dot image formed of a plurality dots, each dot having a density level, the method comprising of the steps of: (a) extracting a dot pattern from the dot image, the dot pattern extracted from the dot image being formed of an observation dot and dots surrounding the observation dot; (b) determining, based on comparison between the dot pattern obtained by the step (a) and predetermined preference patterns, whether or not the observation dot in the dot pattern is either a dropout dot or a projection dot, the dropout dot being defined as a dot which ought to have a first density level, the first density level being a lowest density level from among density levels which can be provided with dots in the dot image, and the projection dot being defined as a dot which ought to have a second density level; and (c) changing a density level of the observation dot to the first density level when the step (b) determines that the observation dot is the dropout dot and changing density level of the observation dot to the second density level when the step (b) determines that the observation dot is the projection dot.

The above objects of the present invention are also achieved by an apparatus for processing a dot image formed of a plurality dots, each dot having a density level, the apparatus comprising: extraction means for extracting a dot pattern from the dot image, the dot pattern extracted from the dot image being formed of an observation dot and dots surrounding the observation dot; determination means for determining, based on comparison between the dot pattern obtained by the extraction means and predetermined reference patterns, whether or not the observation dot in the dot pattern is either a dropout dot or a projection dot, the dropout dot being defined as a dot which ought to have a first density level, the first density level being a lowest density level from among density levels which can be provided with dots in the dot image, and the projection dot being defined as a dot which out to have a second density level; and means for changing a density level of the observation dot to the first density level when the determination means determines that the observation dot is the dropout dot and changing a density level of the observation dot to the second density level when the determination means determines that the observation dot is the projection dot.

According to the present invention, dropout dots and projection dots are formed on edges of the dot iamge in accordance with the referecne patterns. Thus, due to preferable reference patterns, the edges of the dot image can be made look as smooth as possible and the quality of the dot iamge can be improved.

Another object of the present invention is to provide an image processing apparatus in which high quality images formed of dots having gradational levels obtained by the antialiasing process can be printed.

The above objects of the present invention are also achieved by an apparatus for processing a dot image formed of a plurality dots, each dot having a density level, the apparatus comprising: antialiasing process means for performing an antialiasing process in which a size of each dot positioned on an edge of the dot image is controlled so that the edge of the dot image is made be smooth; position control means for controlling a position of an observation dot in an area for one dot based on density levels of the observation dot and dots on both sides of the observation dot, the observation dot being in dots whose sizes are controlled by the antialiasing process means; and printing means for printing the observation dot in accordance with the density level and the position controlled by the position control means.

According to the present invention, as the position of the dots on an edges of the dot iamge are controlled dot by dot, high quality images formed on dots having gradational levels obtained by the antialiasing process can be printed.

Additional objects, features and advantages of the present invention will become apparent from the following detailed description when read in conjunction with the accompanying drawings.

BRIEF DESCRIPTION OF THE DRAWINGS

FIG. 2 is a diagram illustrating dotted images obtained in accordance with a brilliance modulation and a pulse width modulation.

FIG. 14 is a block diagram illustrating a PDL controller shown in FIG. 13.

FIGS. 16A, 16B and 16C are diagrams illustrating an example of a phase control process carried out in the phase controller.

DESCRIPTION OF THE PREFERRED EMBODIMENTS

A description will now be given, with reference to FIGS. 3–9, of a first embodiment of the present invention.

Figure 1A:
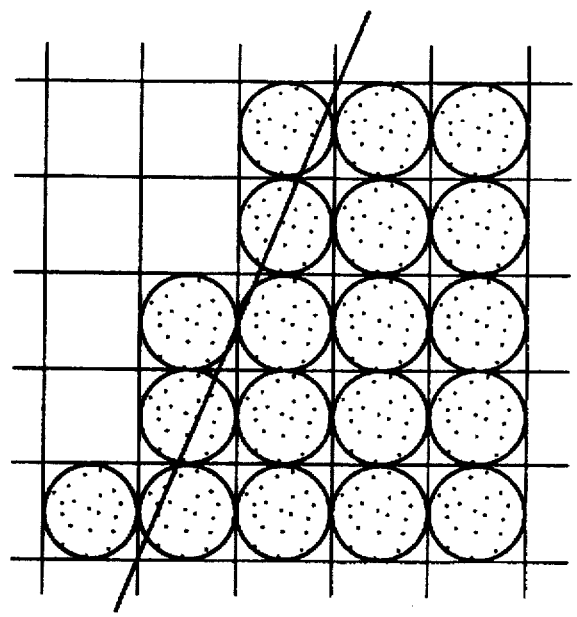
FIGS. 1A and 1B are diagrams illustrating an antialiasing process.
Figure 1B:
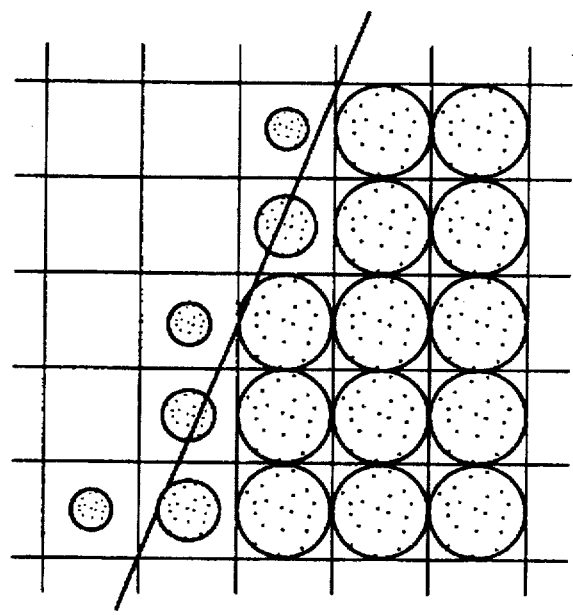
Figure 3:
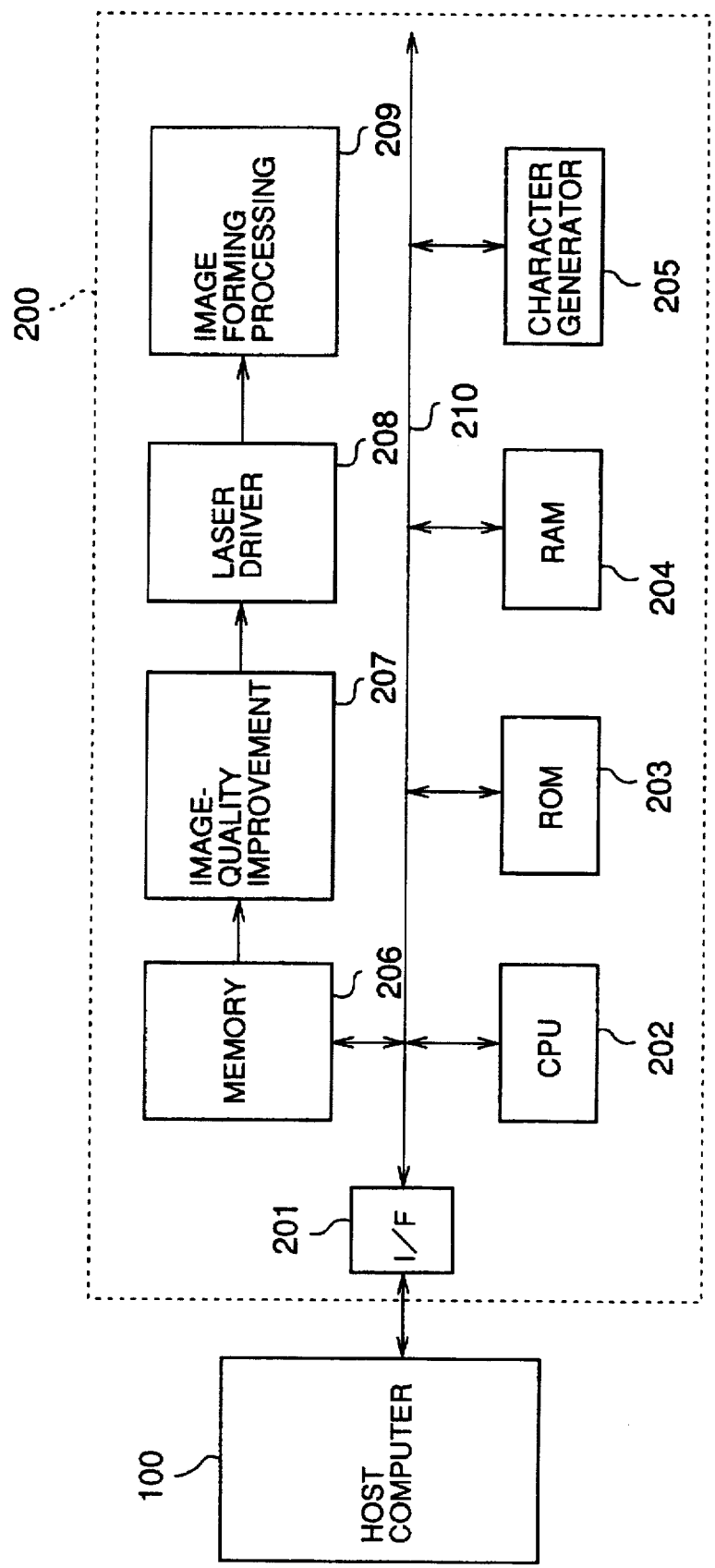
FIG. 3 is a block diagram illustrating an image processing apparatus according to a first embodiment of the present invention.

FIG. 3 shows an image processing unit. Referring to FIG. 3, an image processing unit 200, coupled to a host computer 100, receives image data, character code data and the like supplied from the host computer 100 and outputs printing data. The image processing unit 200 comprises an interface (I/F) 201, a CPU (Central Processing Unit) 202, a ROM (Read Only Memory) 203, a RAM (Random Access Memory) 204, a character generator 205, a memory 206, an image-quality improvement circuit 207, a laser driver 208, an image forming processing unit 209 and an internal system bus 210. The interface 201 receives data transmitted from the host computer 100, and transmits data generated in the image processing unit 200 to the host computer 100. The ROM 203 stores control programs and the CPU 202 controls whole parts of the image processing unit 200 in accordance with the control programs stored in the ROM 203. The data transmitted from the host computer 100 and received by the interface 201 is stored in the RAM 204. After the RAM 204 stores the data for one page, the data for one page is successively rad out from the RAM 204 and stored in the memory 206. When the data is read our from the RAM 204, the character code data is supplied to the character generator 205. The character generator 205 converts the character code data supplied from the host computer 100 into a dot pattern corresponding it. Binary dot data, such as the image data supplied from the host computer 100 and the dot pattern output from the character generator 105, is stored in the image memory 206. The binary dot data stored in the memory 206 is supplied to the image-quality improvement circuit 207. The image-quality improvement circuit 207 processes the binary dot data supplied from the memory 206 so that jagged edges of an image represented by the binary dot data is made to look smooth. The laser driver 208 drives a laser unit (not shown) in accordance with printing data output from the image-quality improvement circuit 207 so that an image is optically written on a photosensitive medium in the image forming process unit 209. The image forming process unit 209 prints the image on a recording sheet in accordance with the electrophotographic process.

Figure 4:
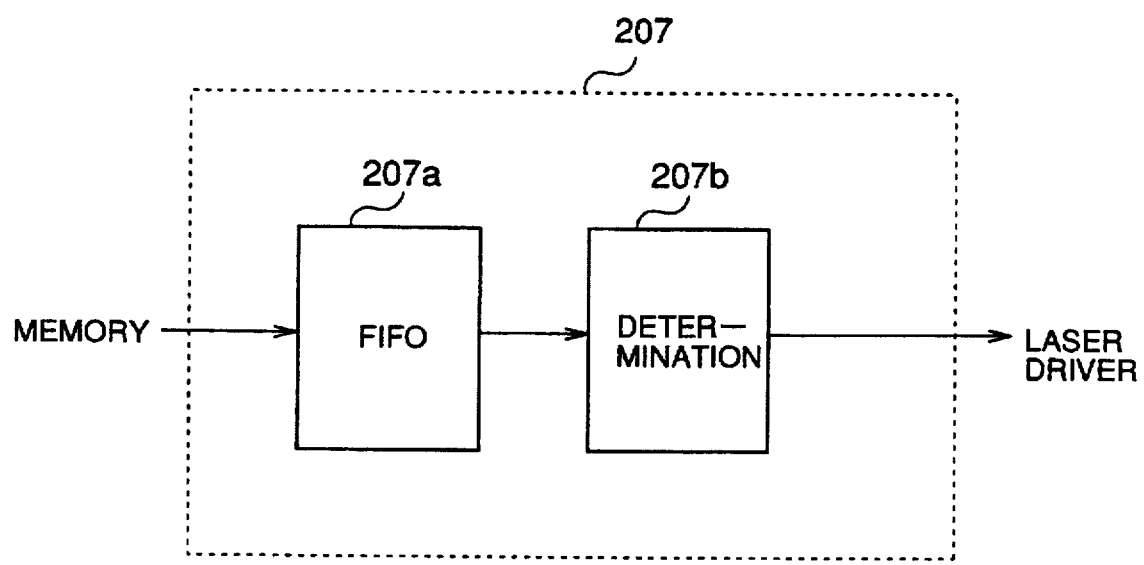
FIG. 4 is a block diagram illustrating an image-quality improvement circuit shown in FIG. 3.

The image-quality improvement circuit 207 is formed as shown in FIG. 4.

Referring to FIG. 4, the image-quality improvement circuit 207 comprises an FIFO (First In First Out) buffer 207a and a determination circuit 207b. The FIFO buffer 207 stores dot pattern data for a few lines which data is serially output from the memory 206. The determination circuit 207b determines whether or not a dot (hereinafter referred to as an observation dot) is a dropout dot and whether or not an observation dot is a projection dot, based on on dot image pattern formed of the observation dot and a plurality of dots surrounding the observation dot. In a case where each dot has a binary data being either white or black, the dropout dot is defined as a black dot which is to be white, and the projection dot is defined as a white dot which is to be black white. The determination circuit 207b changes the observation dot determined as the dropout dot from the black dot to a white dot, and changes the observation dot determined as the projection dot from the white dot to a black dot. The binary image data corresponding to either the white dot or the black dot is supplied from the determination circuit 207b to the laser driver 208.

Figure 5:
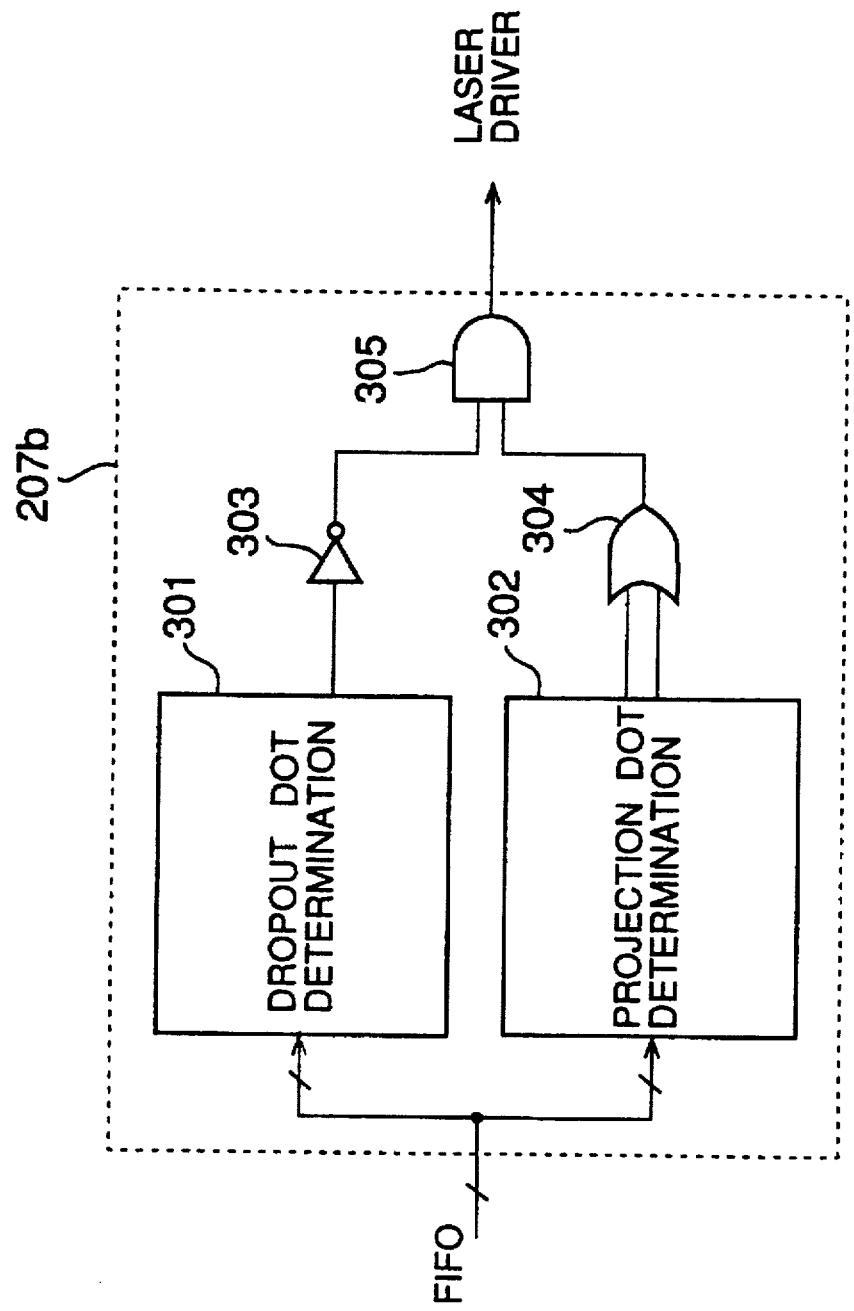
FIG. 5 is a block diagram illustrating a determination circuit included in the image-quality improvement circuit shown in FIG. 4.
Figure 6:
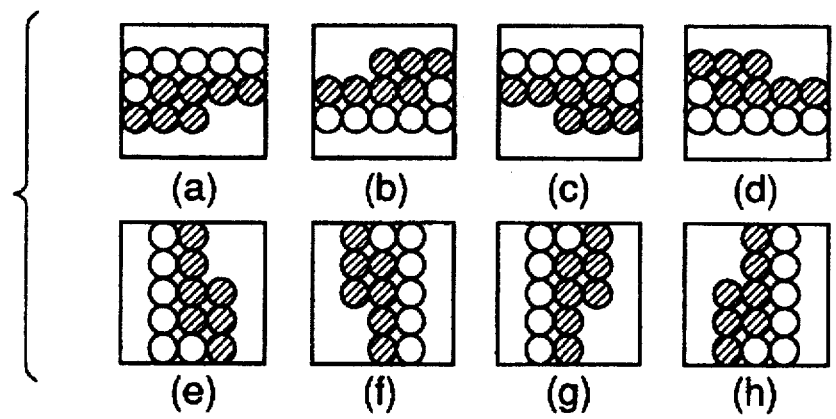
FIG. 6 is a diagram illustrating reference dot patterns used for determining dropout dots.

The determination circuit 207b is formed as shown in FIG. 5. Referring to FIG. 5, the determination circuit 207b comprises a dropout dot determination circuit 301, an projection dot determination circuit 302, an inverter 303, an OR gate 304 and an AND gate 305. Each of the dropout dot determination circuit 301 and the projection dot determination circuit 302 has five shift registers each having five bits at an input portion thereof. The binary image data supplied from the FIFO buffer 207a dot by dot is stored in the five shift registers in each of the dropout dot and the projection dot determination circuits 301 and 302, so that 5×5 dot pattern data (5 lines and each line having 5 dots) is stored in the five registers. The dropout dot determination circuit 301 is provided with reference dot patterns (a) through (h) as shown in FIG. 6. The dropout determination circuit 301 compares the dot pattern stored in the five shift registers to each of the reference dot patterns (a) through (h) shown in FIG. 6. When the dot pattern stored in the five shift registers is the same as one of the reference dot patterns, a detection signal output from the dropout dot determination circuit 301 is activated ("1"; a high level). On the other hand, when the dot pattern data stored in the five shift registers is the same as none of the reference patterns, the detection signal is inactive ("0"; a low level). The detection signal output from the dropout dot determination circuit 301 is supplied to the inverter 303.

In each of the reference dot patterns (a) through (h) shown in FIG. 6, each white circle indicates a white dot, each circle marked by slanging lines indicates a black dot, and spaces having no circle indicates that white and black dots may exist. The observation dot is positioned at a center of the 5×5 matrix dot pattern (at a third dot on a third line). Thus, when the dot pattern stored in the five shift registers is, for example, the same as the reference dot pattern (a), the observation dot is changed from the black dot to a white dot. In each of dot patterns (the 5×5 dot matrix), a position of each dot is identified by (N, M) where N is the number of dots from the left edge of the 5×5 dot matrix and M is the number of lines from the upper end of the 5×5 dot matrix. The position of the observation dot is identified by (3, 3).

Figure 7:
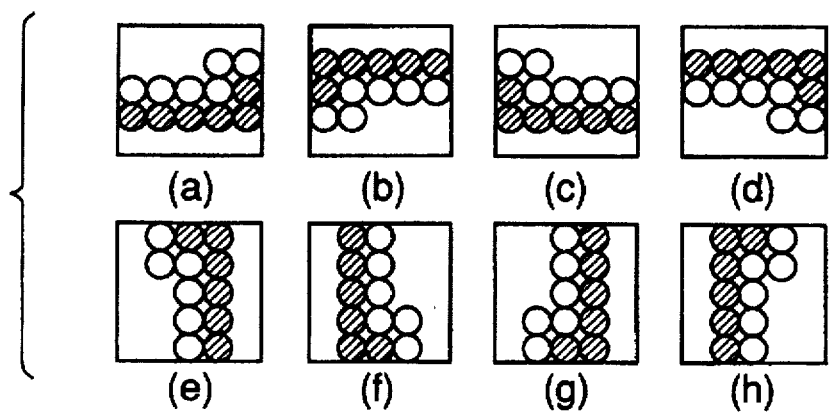
FIG. 7 is a diagram illustrating reference dot patterns used for determining projection dots.

The projection dot determination circuit 302 is provided with reference dot patterns (a) through (h) shown in FIG. 7. The projection determination circuit 302 compares the dot pattern stored in the five shift registers to each of the reference dot patterns (a) through (h) shown in FIG. 7. When the dot pattern stored in the five shift registers is the same as one of the reference dot patterns shown in FIG. 7, a detection signal output from the dropout dot determination circuit 301 is activated ("1"; a high level). On the other hand, when the dot pattern data stored in the five shift registers is the same as none of the reference patterns, the detection signal is inactive ("0"; a low level). The detection signal output from the projection dot determination circuit 301 is supplied to the OR gate 304. The binary dot data of the observation dot is also supplied from the projection dot determination circuit 302 to the OR gate 304. When the dot pattern data stored in the five shift registers is, for example, the same as the reference dot pattern (a) shown in FIG. 7, the observation dot is changed from the white dot to the black dot.

The AND gate 305 inputs signals from the inverter 303 and the OR gate 304 and outputs an logical product of the input signals. The output signal from the AND gate 305 is supplied to the laser driver 208. When the detection signal output from the dropout dot determination circuit 301 is inactive "0" and the binary dot data of the observation dot has a high level "1" and/or the detection signal output from the projection dot determination circuit 302 is activated "1", the output signal of the AND gate 305 has a high level "1" corresponding to a black dot. When the detection signal output from the dropout dot determination circuit 301 is activated "1", the binary dot data of the observation dot has the high level "0" and the detection signal output from the projection dot determination circuit 302 is inactive "0", the output signal of the AND gate 305 has a low level "0" corresponding to a white dot. When the dropout dot determination circuit 301 and the projection dot determination circuit 302 respective determines that the observation dots are not the dropout dot and the projection dot, both the detection signals output from the dropout dot determination circuit 301 and the projection dot determination circuit are inactive "0". Thus, the binary dot data of the observation dot is supplied to the laser driver 208.

Figure 8A:
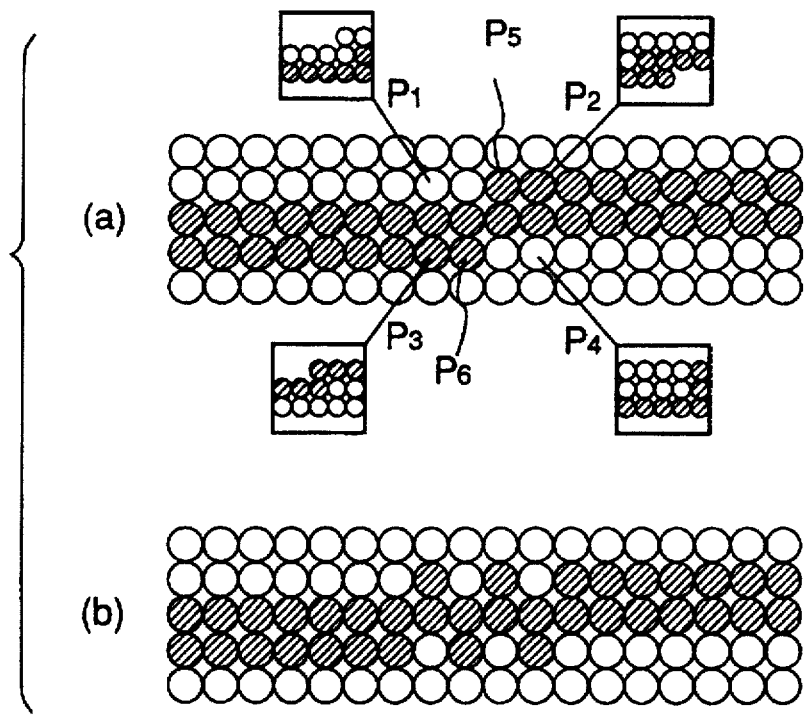
FIGS. 8A and 8B are diagrams illustrating an example of a processing in the image-quality improvement circuit.

When binary dot data of a line extending in a horizontal direction as shown in FIG. 8A (a) is processed in the image-quality improvement circuit 207, binary dot data of a line as shown in FIG. 8A (b) is output from the image-quality improvement circuit 207. In FIG. 8A (a), steps are formed on the borders of the line at block dots P5 and P6. Each of the black dots P5 and P6 is referred to as a step dot. A 5×5 dot matrix pattern formed of a white dot P1 and dots surrounding it is the same as the reference dot pattern (a) shown in FIG. 7, a 5×5 dot matrix pattern formed of a black dot P2 and dots surrounding it is the same as the reference dot pattern (a) shown in FIG. 6, a 5×5 dot matrix pattern formed of a black dot P3 and dots surrounding it is the same as the reference pattern (b) shown in FIG. 6 and a 5×5 dot matrix pattern formed of a white dot P4 and dots surrounding it is the same as the reference pattern (b) shown in FIG. 7. Thus, the white dots P1 and P4 are determined as the projection dots, so that the white dots P1 and P4 are changed to black dots. The black dots P2 and P3 are determined as the dropout dots, so that the black dots P2 and P3 are changed to white dots. As a result, the binary dot data corresponding the line as shown in FIG. 8A (a) is converted into the binary dot data as shown in FIG. 8A (b).

Figure 8B:
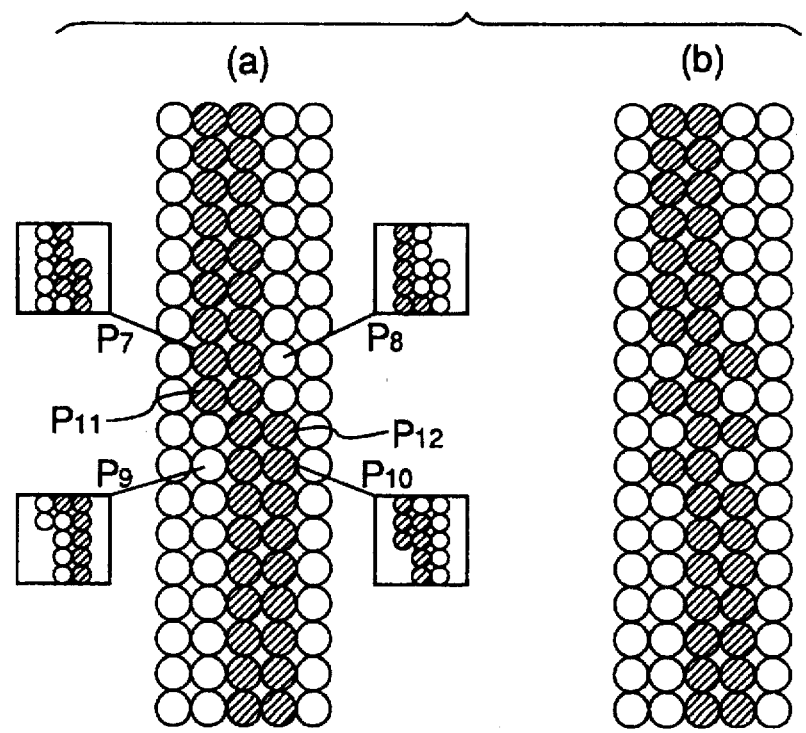

When binary dot data of a line extending in a vertical direction as shown in FIG. 8B (a) is processed in the image-quality improvement circuit 207, binary dot data of a line as shown in FIG. 8B (b) is output from the image-quality improvement circuit 207. In FIG. 8B (a), steps are formed on the borders of the line at black dots P11 and P12. That is, the black dots P11 and P12 are step dots. In FIG. 8B (b), a 5×5 dot matrix pattern formed of a black dot P7 and dots surrounding it is the same as the reference dot pattern (e) shown in FIG. 6, a 5×5 dot matrix pattern formed of a white dot P8 and dots surrounding it is the same as the reference dot pattern (f) shown in FIG. 7, a 5×5 dot matrix pattern formed of a white dot P9 and dots surrounding it is the same as the reference dot pattern (e) shown in FIG. 7 and a 5×5 dot matrix pattern formed of a black dot P10 and dots surrounding it is the same as the reference dot pattern (f) shown in FIG. 6. Thus, the black dots P7 and P10 are determined as the dropout dots, so that the black dots P7 and P10 are changed to white dots. The white dots P8 and P9 are determined as the projection dots, so that the white dots P8 and P9 are changed to black dots. As a result, the binary dot data corresponding the line as shown in FIG. 8B (a) is converted into the binary dot data as shown in FIG. 8B (b).

Figure 9:
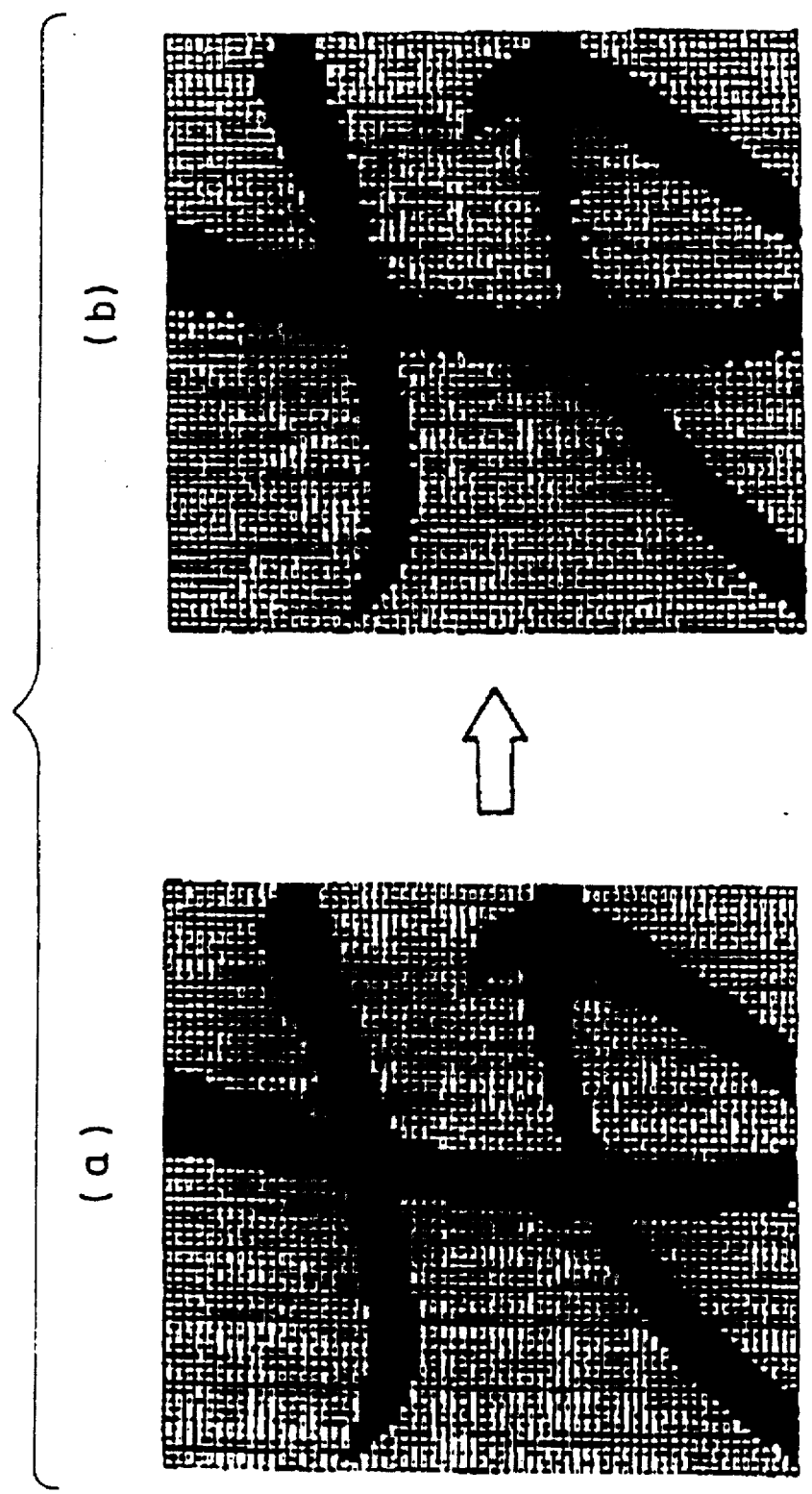
FIG. 9 is a diagram illustrating a result obtained by the image-quality improvement circuit.

In a case where the above process (an image-quality improvement process) is applied to a character image as shown in FIG. 9 (a), a character image as shown in FIG. 9 (b) is obtained. That is, jagged edges of the character image is made look smooth, so that the quality of the character image is improved.

In the above first embodiment, both the dropout dots and the projection dots are made. However, even if only either the dropout dots or the projection dots are formed on edges of an image, the jagged edges of the character can be made look smooth. Here, when a dropout dot and a projection dot are respectively formed in three or less black dots and three or less white dots sequentially arranged from each step dot on the border of an image, there is a case where the quality of the image rather deteriorates. Thus, it is preferable that the dropout dot and the projection dot be formed in four or more black dots and four or more white dots sequentially arranged from each step dot.

As, when a person recognizes an image, a minimum principle is applied to the recognition of the image, the jagged edge of the image to which the above image-quality improvement process is applied is made look smooth.

A description will now be given of a second embodiment of the present invention. In the second embodiment, a dropout dot or a projection dot is formed in dots on the border of an image in accordance with the number of dots between step dots. An image processing unit according to the second embodiment of the present invention is formed as shown in FIGS. 3, 4 and 5, in the same manner as that according to the first embodiment.

Figure 10:
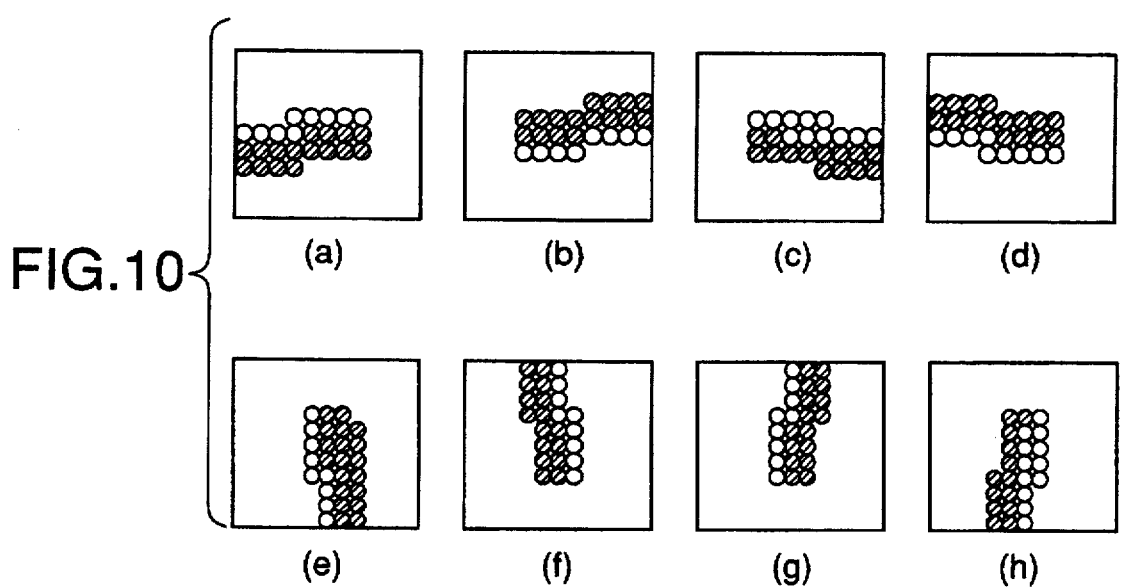
FIG. 10 is a diagram illustrating other dot patterns used for determining dropout of a dot in a second embodiment.

Each of the dropout dot determination circuit 301 and the projection dot determination circuit 302 is provided with eleven shift registers each having eleven bits. That is, a 11×11 dot matrix pattern data is stored in the eleven shift registers in each of the dropout dot determination circuit 301 and the projection dot determination circuit 302. The dropout dot determination circuit 301 stores eight reference dot patterns (a) through (h) shown in FIG. 10. A 11×11 dot matrix pattern stored in the eleven shift registers is compared with each of the reference dot patterns (a) through (h) shown in FIG. 10. When the 11×11 dot matrix pattern is the same as one of the reference dot patterns (a) through (h), an observation dot positioned at the center (6, 6) of the 11×11 dot matrix pattern is determined as the dropout dot, and the detection signal output from the dropout determination circuit 301 is activated.

Figure 11:
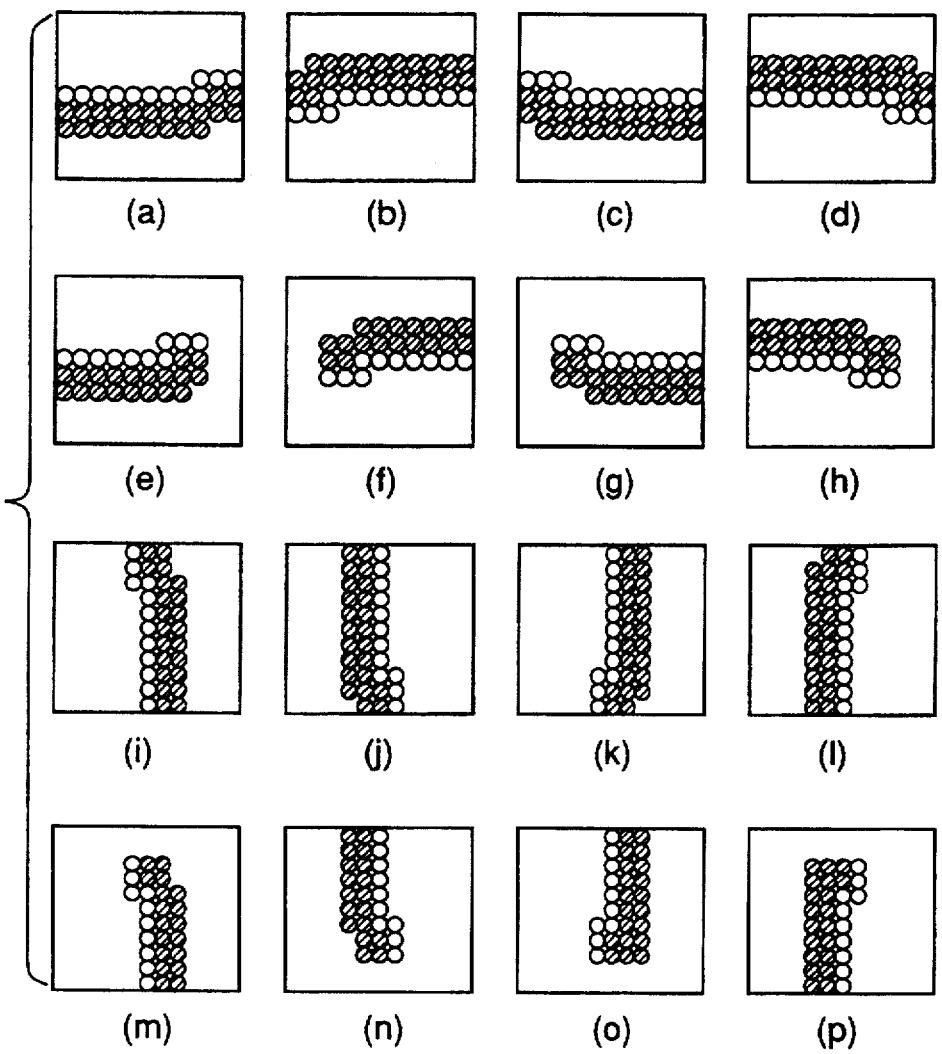
FIG. 11 is a diagram illustrating other dot patterns used for determining projection of a dot in a second embodiment.

The projection dot determination circuit 302 stores sixteen reference dot patterns (a) through (p) shown in FIG. 11. The projection dot determination circuit 302 compares a 11×11 dot matrix pattern stored in the eleven shift registers with each of the reference patterns (a) through (p) shown in FIG. 11. When the 11×11 dot matrix pattern is the same as one of the reference dot patters (a) through (p), an observation dot positioned at the center (6, 6) of the 11×11 dot matrix pattern is determined as the projection dot, and the detection signal output from the projection determination circuit 302 is activated.

Figure 12A:
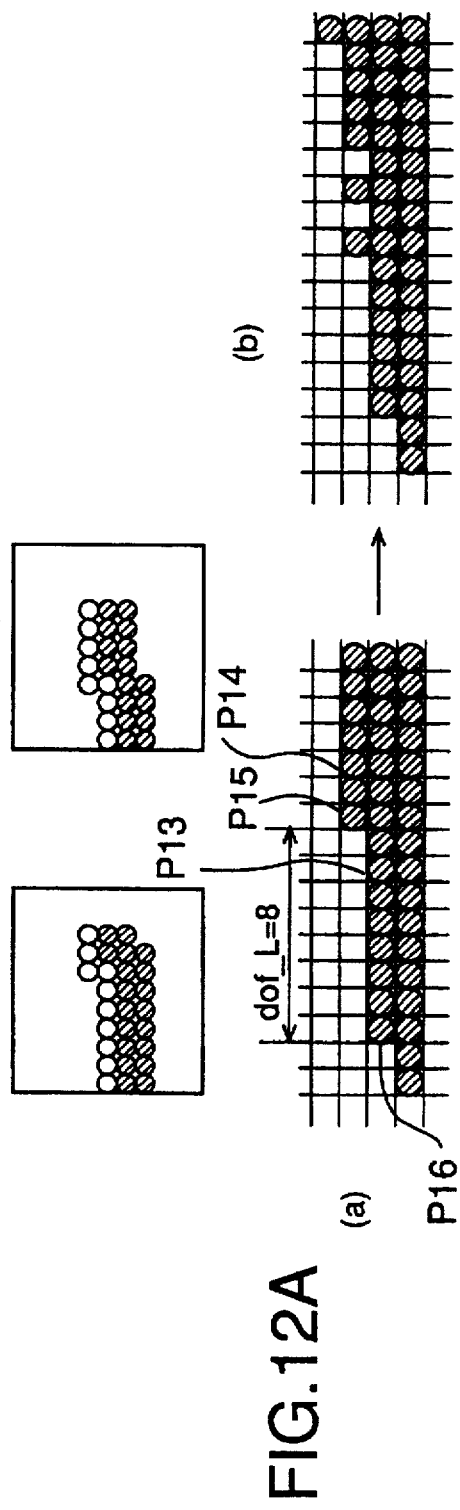
FIGS. 12A and 12B is a diagram illustrating another example of the processing in the image-quality improvement circuit according to the second embodiment.

When binary dot data as shown in FIG. 12A (a) is processed in the image-quality improvement circuit 207, binary dot data as shown in FIG. 12A (b) is output from the image-quality improvement circuit 207. In FIG. 12A (a), there are step dots P15 and P16 on the border of the image, and eight white dots are sequentially arranged between the step dots P15 and P16 (dot L=8). A 11×11 dot matrix pattern formed of a white dot P13 and dots surrounding it is the same as the reference dot pattern (e) shown in FIG. 11, and a 11×11 dot matrix pattern formed of a black dot P14 and dots surrounding it is the same as the reference dot pattern (a) shown in FIG. 10. Thus, the white dot P13 is determined as the projection dot, so that the white dot P13 is changed to a black dot. The black dot P14 is determined as the dropout dot, so that the black dot P14 is changed to a white dot. As a result, the binary dot image as shown in FIG. 12A (a) is converted into the binary dot image as shown in FIG. 12 (b).

Figure 12B:
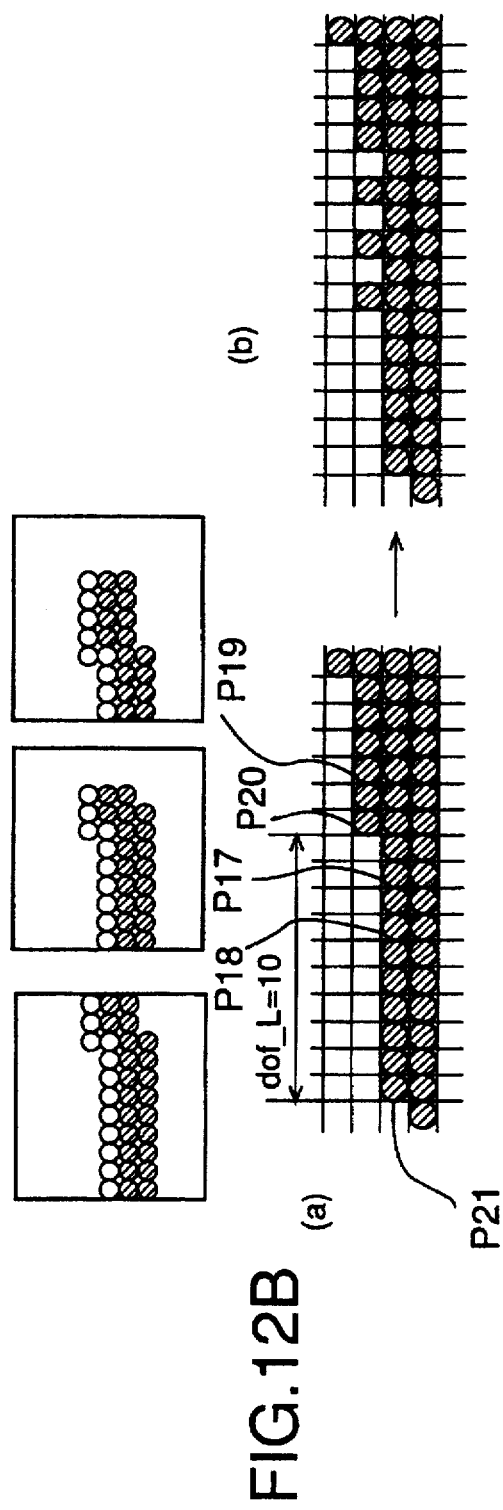

When binary dot data as shown in FIG. 12B (a) is processed in the image-quality improvement circuit 207, binary dot data as shown in FIG. 12B (b) is output from the image-quality improvement circuit 207. In FIG. 12B (a), there are step dots P20 and P21 on the border of the image, and ten white dots are sequentially arranged between the step dots P15 and P16 (dot L=10). In FIG. 12B (a), a 11×11 dot matrix formed of a white dot P17 and dots surrounding it is the same as the reference dot pattern (e) shown in FIG. 11, a 11×11 dot matrix pattern formed of a white dot P18 and dots surrounding it is the same as the reference dot pattern (a) shown in FIG. 11 and a 11×11 dot matrix pattern formed of a black dot P19 and dots surrounding it is the same as the reference dot pattern (a) shown in FIG. 10. Thus, the white dots P17 and P18 are determined as the projection dots, so that both the white dots P17 and P18 are changed to black dots. The black dot P19 is determined as the dropout dot, sot that the black dot P19 is changed to white dot. As a result, the binary dot image shown in FIG. 12B (a) is converted into the binary dot image shown in FIG. 12B (b).

In the above second embodiment, the dropout dots and the projection dots are respectively formed in black dots and white dots on the border of the image based on the number of black and white dots sequentially arranged between the step dots on the border of the image. Thus, jagged edges of the image can be made look further smooth.

The present invention can be also applied to an image processing unit which multi-level image data is processed dot by dot. In this case, after the multi-level image data of each dot is quantized in binary data, the above process is performed. The density level of the projection dot formed on the border of the image is set at a predetermined value or is determined based on the density level of the step dot.

A description will now be given, with reference to FIGS. 13 through 23, of a third embodiment of the present invention.

Figure 13:
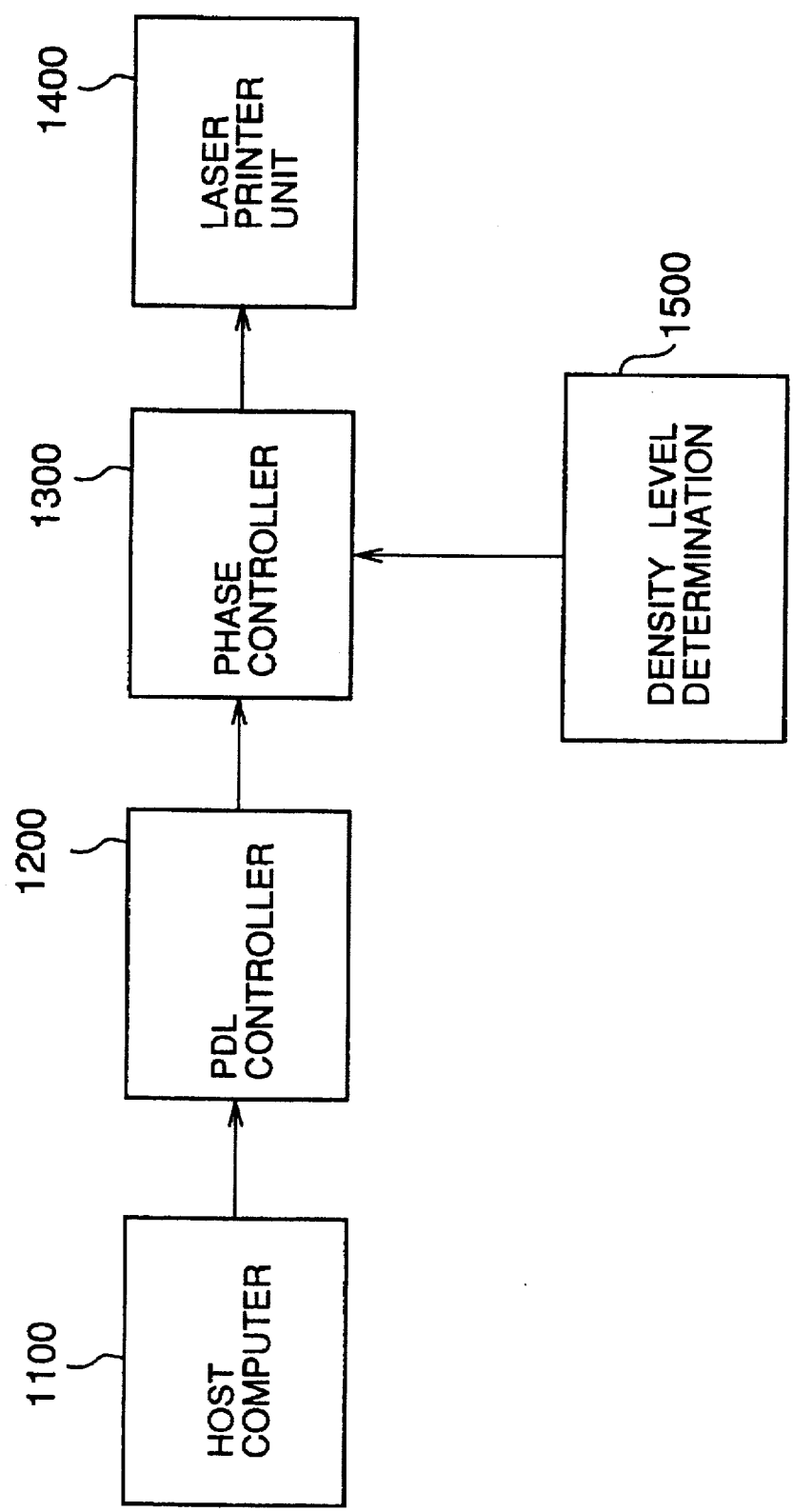
FIG. 13 is a block diagram illustrating an image forming system including an image processing apparatus according to a third embodiment of the present invention.

Referring to FIG. 13, which shows an image forming system according to the third embodiment, the image forming system comprises a host computer 1100, a PDL (Page Description Language) controller 1200, a phase controller 130, a laser printer unit 1400 and a density level setting circuit 1500. The host computer 1100 makes a document file (image data) described by a PDL language such as the "POST SCRIPT". The PDL controller 1200 receives the document file supplied from the host computer 1100 page by page and carries out the antialiasing process with respect to vector images included in the document file. After the antialiasing process, image data formed of dots each having multi-level density is mapped on a page memory 1205. The phase controller 1300 outputs image data and phase data used for controlling a phase at which a laser element provided in the laser printer unit 1400 is to be turned on. The laser printer unit 1400 prints images based on the image data and the phase data supplied from the phase controller 1300. The density level setting circuit 1500 determines a low-density boundary level L and a high-density boundary level H. The low-density boundary level L and the high-density boundary level H are supplied from the density level setting circuit 1500 to the phase controller 1300.

The PDL controller 1200 is formed as shown in FIG. 14. Referring to FIG. 14, the PDL controller 1200 comprises a receiver unit 1201, a CPU (Central Processing Unit) 1202, a ROM (Read Only Memory) 1203, a RAM (Random Access Memory) 1204, a page memory 1205, a transmitter unit 1206 and an internal system bus 1207. The receiver unit 1201 receives data supplied from the host computer 1100. The data supplied from the host computer 100 is described, for example, by the PDL language. The CPU 1202 carries out various control process in accordance with programs stored in the ROM 1203. The RAM 1204 temporarily stores data used in the control processes carried by the CPU 1202. The page memory 1205 stores image data (dotted image data) for one page. The transmitter 1206 transmits the image data stored in the page memory to the phase controller 1300. The receiver unit 1201, the CPU 1202, the ROM 1203, the RAM 1204 and the page memory 1205 are coupled to each other by the internal system bus 1207.

The image data described by the PDL language received by the receiver unit 1201 is supplied to the RAM 1204 via the internal system bus 1207, and temporarily stored in the RAM 1204. When the amount of image data stored in the RAM 1204 reaches one page, the antialiasing process is applied to the image data stored in the RAM 1204. Due to the antialiasing process, RGB multi level data is obtained, and the RGB multi level data for one page is stored in the page memory 1205. The RGB multi level data stored in the page memory 1205 is transmitted to the phase controller 1300 via the transmission unit 1206.

Figure 15A:
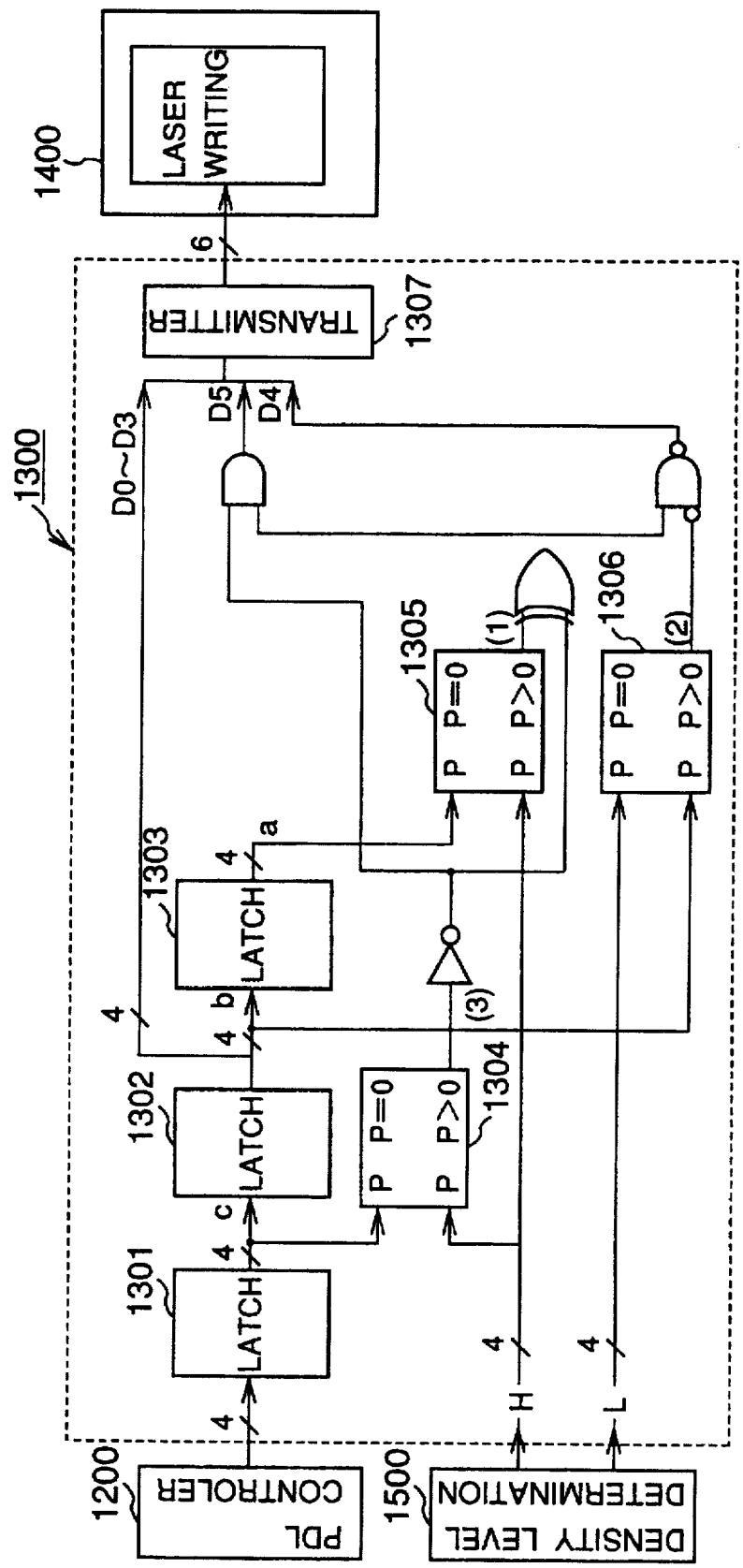
FIG. 15A is a circuit diagram illustrating a phase controller shown in FIG. 13.

The phase controller 1300 is formed as shown in FIG. 15A. Referring to FIG. 15A, the phase controller 1300 receives the image data (density level data), the density level data is latched dot by dot in latches 1301, 1302 and 1303. That is, density level data a, b and c latched by the latches 1303, 1302 and 1301 are image data of three dots adjacent to each other. The density level data b latched by the latch 1302 corresponds to an observation dot. The density level data c and a of dots adjacent to the observation dot are respectively compared, by the comparators 1304 and 1305, with the high-density boundary level H supplied from the density level setting circuit 1500. The comparators 1304 and 1305 respectively determines whether or not the density level data c and a are greater than the high-density boundary level H. The density level data b corresponding to the observation dot is compared, by a comparator 1306, with the low-density boundary level L supplied from the density level setting circuit 1500. The comparator 1305 determines whether or not the density level data b corresponding to the observation dot is less than the low-density boundary level L. The output signals from the comparators 1304, 1305 and 1306 are supplied, as phase data D4 and D5, to a transmitter 1307 via a logic circuit including an inverter, an exclusive OR gate, and AND gate and a NAND gate.

Figure 15B:
FIG. 15B is a table illustrating phase data D4 and D5.

The phase data D4 and D5 are changed in accordance with levels of the output signals (1), (2) and (3) from the comparators 1303, 1302 and 1301, as shown in FIG. 15B. In FIG. 15B, phase data (D4=0, D5=0) indicates a left side phase, phase data (D4=0, D5=1) indicates a right side phase, and phase data (D4=1, D5=0) indicates a central phase. In the left side phase, an observation dot is formed in an area for one dot so as to close to the next dot on the left side of the observation dot. In the right side phase, an observation dot is formed in an area for one dot so as to close to the next dot on the right side of the observation dot. In the central phase, an observation dot is formed at the center of an area for one dot.

The density level data b (D0–D3) of the observation dot is output from the latch 1302 and is also supplied to the transmitter 1307. The transmitter 1307 transmits the phase data D4 and D5 and the density level data (D0–D3) of the observation dot to the laser printer unit 1400.

The phase controller 1300 carries out a phase control process, so that a position at which each dot is to be formed is controlled. In a case where density level data of respective dots is distributed as shown in FIG. 16A, if the phase control process is not carried out, previous dots are formed as shown in FIG. 16B. On the other hand, when the density level data as shown in FIG. 16A is processed by the phase controller 1300, respective dots are formed as shown in FIG. 16C. In FIG. 16C, dots positioned on edges of an image are close to dots in the image. Thus, the edges of the image can be made look smooth.

Figure 17A:
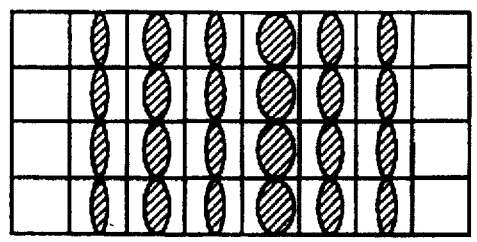
FIGS. 17A, 17B and 17C are diagrams illustrating another example of the phase control process carried out in the phase controller.
Figure 17B:
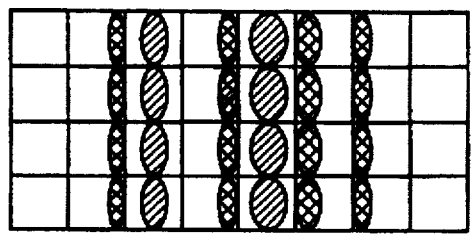
Figure 17C:
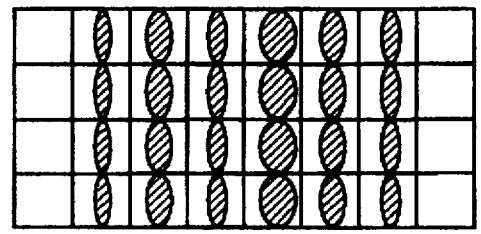

FIG. 17A indicates a half tone image in which density gradually varies. When the half tone image as shown in FIG. 17A is processed in accordance with the phase control process in which each observation dot (having a low density level data) is always made to be close to a next dot, having higher density level data, on the right or left side, the half tone image is distorted by the phase control process as shown in FIG. 17B. To prevent the half tone image from being distorted, in the third embodiment, it is determined, by use of the high-density boundary level H and the low-density boundary level L, whether or not each dot is to be processed in accordance with the phase control process. When it is determined that a dot is to be processed in accordance with the phase control process, the phase control process is applied to the dot. As a result, the half tone images are mostly processed without the phase control process, so that the half tone images are prevented from being distorted by the phase control process.

Figure 18:
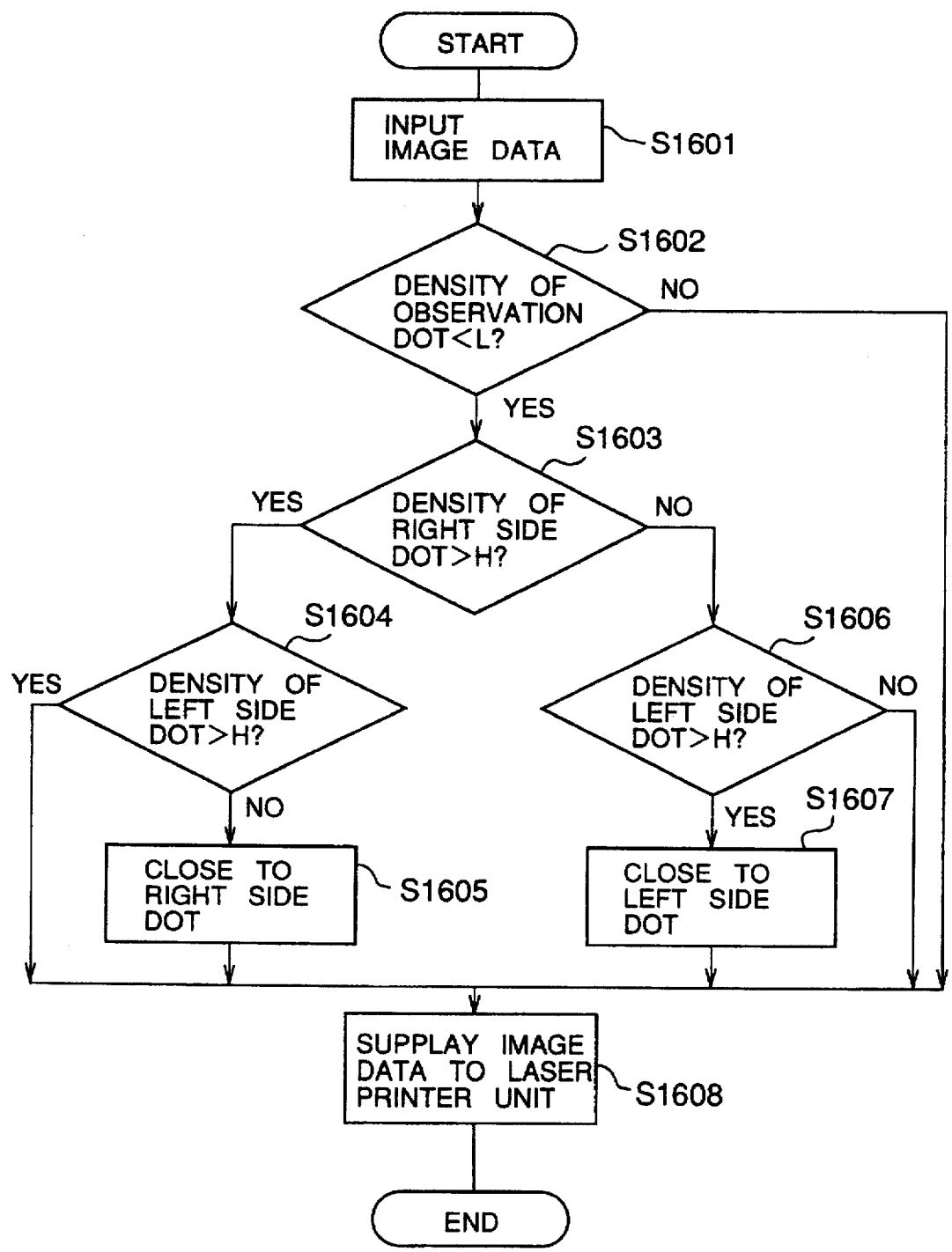
FIG. 18 is a flow chart illustrating an operation of the phase controller.

FIG. 18 is flow chart illustrating a procedure carried out in the phase controller 1300.

Referring to FIG. 18, in step S1601, the phase controller 1300 receives image data (density level data) supplied from the page memory 1205. In step S1602, the density level data of an observation dot is compared with the low-density boundary level L, and it is determined whether or not the density level of the observation dot is less than the low-density boundary level L. When the density level of the observation dot is equal to or greater than the low-density boundary level L, the process proceeds to step S1608. On the other hand, when the density level of the observation dot is less than the low-density boundary level L, the process proceeds to step S1603. That is, only when the density level data of the observation dot is less than the low-density boundary level L, the phase control process is carried out.

In step S1603, the density level of the next dot on the right side of the observation dot is compared with the high-density boundary level H, and it is determined whether or not the density level of the next dot on the right side is greater than the high-density boundary level H. When the density level of the next dot on the right side is greater than the high-density boundary level H, it is determined whether or not the density level data of the next dot on the left side of the observation dot is greater than the high-density boundary level H, in step S1604. Here, when the density level data of the next dot on the left side is not greater than the high-density boundary level H, the phase control is performed so that the observation dot is made be close the next dot on the right side (in step S1605). On the other hand, the density level of the next dot on the right side of the observation dot is not greater than the high-density boundary level H (in step S1603), it is determined whether or not the density level data of the next dot on left side of the observation dot is greater than the high-density boundary level H, in step S1606. In this case, when the density level data of the next dot on the left side is greater than the high-density boundary level H, the phase control is performed so that the observation dot is made be close to the next dot on the left side (in step S1607).

When the density level data of both the nest dots on the right and left sides are greater than the high-density boundary level, the observation dot is not to be positioned on an edge of an image. Thus, in this case, the phase control process is not applied to the observation dot.

After that, the density level data of the observation dot and the phase data D4 and D5 obtained by the above process are supplied to the laser printer unit 1400 (step S1608).

The density level setting circuit 1500 determines the high-density boundary level H and the low-density boundary level L, based on the a state in which the electrophotographic process (a gamma characteristic) is performed in the laser printer unit 1400, so that the high quality images can be printed out. The density level setting circuit 1500 comprises a gamma characteristic detecting unit, a density data determination unit and a boundary level determination unit. The gamma characteristic detecting unit detects the gamma characteristic of the laser printer unit 1400 based on characteristics between the density level data and the density of the printed image. The density data determination unit determines density level data B based on the gamma characteristic and a saturation printing density at which the density of the printed image is saturated. The density data determination unit also determines density level data A based on the gamma characteristic and the lowest printing density at which the image can be printed. The boundary level determination unit determines the high-density boundary level H and the low-density boundary level L within a range between the density level data A and B.

Figure 19:
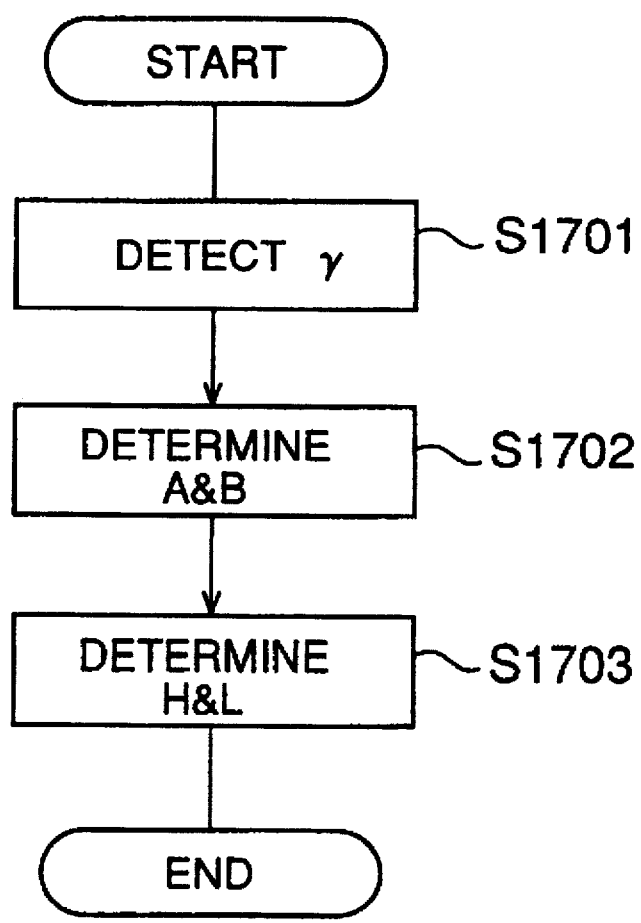
FIG. 19 is a flow chart illustrating an operation of a density level determination circuit shown in FIG. 13.

The density level setting circuit 1500 operates in according to a flow chart as shown in FIG. 19.

Figure 20:
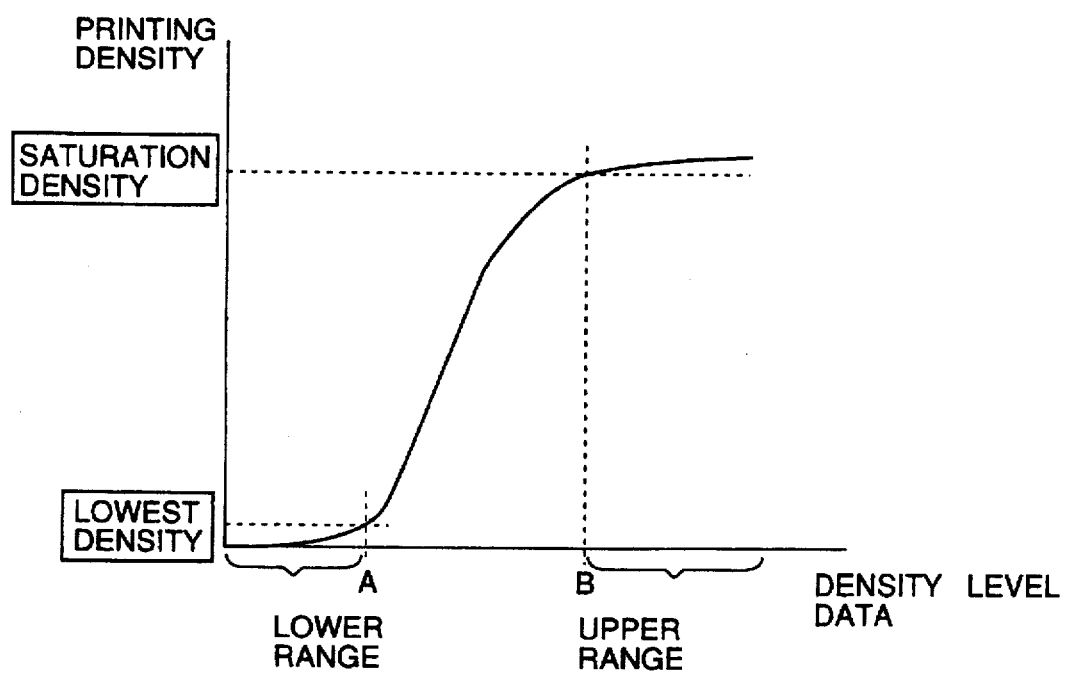
FIG. 20 is a graph illustrating a relationship between density of a printed dot and density data.

Referring to FIG. 19, the gamma characteristic detecting unit detects a state (a gamma characteristic) of the electrophotographic process carried out in the laser printer unit 1400 (step S1701). A lower range of density level data by which the density of the printed image is too low and a upper range of density level data by which the density of the printed image is saturated depend on the gamma characteristic of the laser printer unit 1400, as shown in FIG. 20. The density data determination unit determines the density level data A which is a border of the lower range and the density level data B which is a border of the upper range (step S1703). Then the boundary level determination unit determines the high-density boundary level H and the low-density boundary level L within the rage between the density level data A and B (step S1703).

The boundary level determination unit determines the high-density boundary level H and the low-density boundary level L as follows.

A transfer equation, in which a ratio of a solid image to a half tone image is an argument, for transforming the density level data A and B into the high-density boundary level and the low-density boundary level is used for determining the high-density boundary level H and the low-density boundary level L.

Figure 21A:
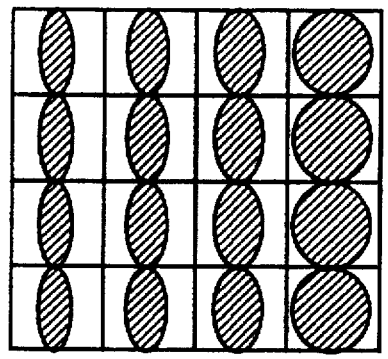
FIGS. 21A, 21B and 21C are diagrams illustrating a process in which a high-density level border value H and a low-density level border value L are obtained based on low-density data A and high-density data B.
Figure 21B:
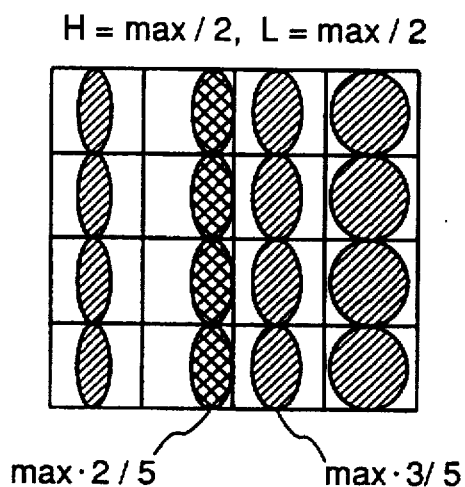
Figure 21C:
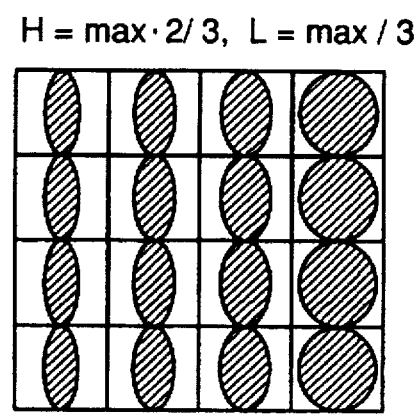

Regarding the half tone image which is to be printed without the phase control as shown in FIG. 21A, if both the high-density boundary level H and the low-density boundary level L are set to the half (½) of the highest density level, a part of dots of the half tone image is processed in accordance with the phase control process as shown in FIG. 21B. As a result the half tone image is distorted. However, if the high-density boundary level H and the low-density boundary level L are respectively set to two third (⅔) of the highest density level and to one third (⅓) of the highest density level, no phase control process is applied to all dots included in the half tone image, as shown in FIG. 21C. Here, the highest density level is generated based on the density level data B.

Figure 22A:
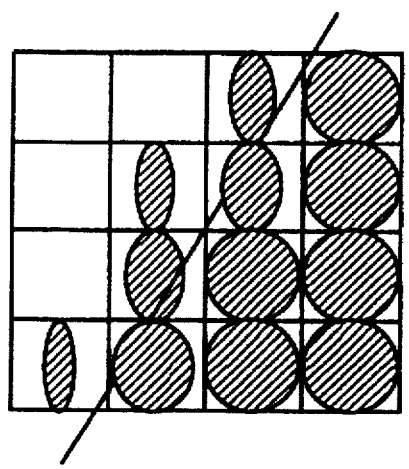
FIGS. 22A, 22B and 22C are diagrams illustrating another process in which a high-density level border value H and a low-density level border value L are obtained based on low-density data A and high-density data B.
Figure 22B:
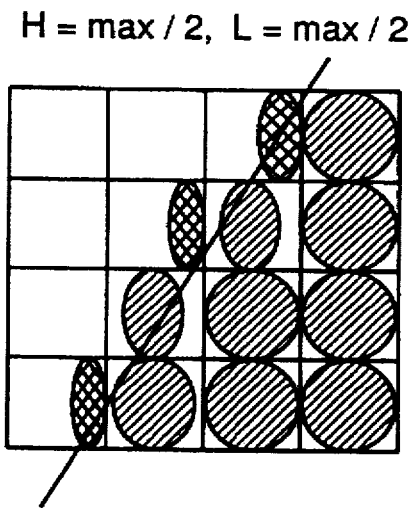
Figure 22C:
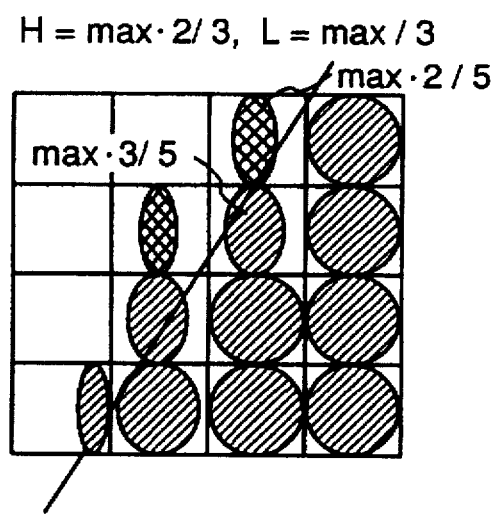
Figure 23:
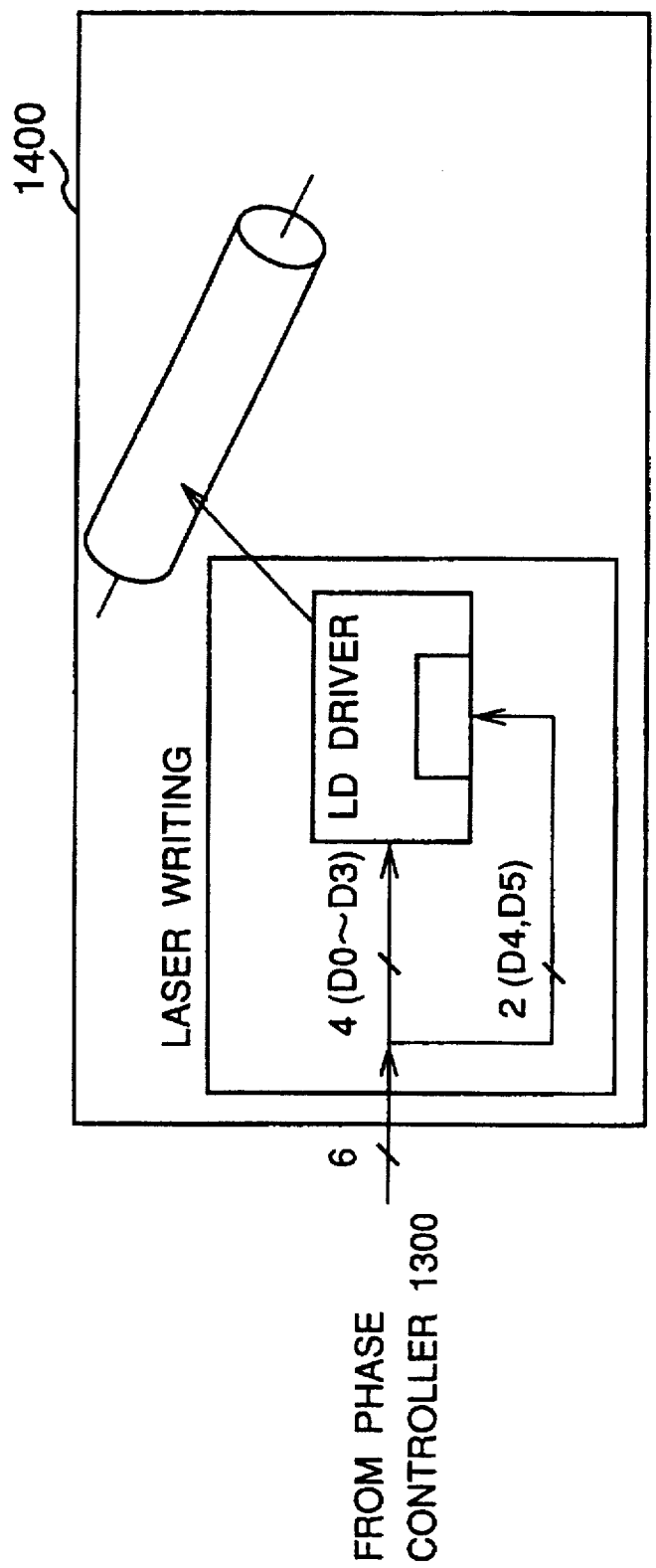
FIG. 23 is a block diagram illustrating a writing unit a laser beam printer.

On the other hand, regarding a solid image (a vector image) which is processed in accordance with the antialiasing process and is printed as shown in FIG. 22A, if both the high-density boundary level H and the low-density boundary level L are set to the half (½) of the highest density level, the phase control is applied to almost all dots on the edge of the solid image, as shown in FIG. 22B. As a result, the antialiasing process effectively functions. However, if the high-density boundary level H and the low-density boundary level L are respectively set to two third (⅔) of the highest density level and one third (⅓) of the highest density level, the phase control is not applied to a part of dots on the edge of the solid image, as shown in FIG. 22C.

As described above, the optimum high-density boundary level and the optimum high-density boundary level depend on the type of image (the half tone image or the solid image). Thus, it is necessary to change the high-density boundary level H and the low-density boundary level L in accordance with the type of image. Regarding the solid image (the vector image), the high density boundary level H and the low-density boundary level L are determined so that the difference between the boundary levels H and L is smaller as possible and both the boundary levels H and L are at the center of the range between the density level data A and B. Regarding an image almost formed of the half tone image, the high-density boundary level H and the low-density boundary level L are determined so that the difference between the boundary levels H and L is larger as possible.

Thus, the high-density boundary level H and the low-density boundary level L are determined based on the ratio of the solid image to the half tone image in the image to be processed.

The high-density boundary level H and the low-density boundary level L may be supplied to the system by an input operation of a user.

The laser printer unit 1400 is operated as follows.

A laser writing circuit of the laser printer unit 1400 divides the data supplied from the phase controller 1300 into the density level data D0–D3 and the phase data D4 and D5. The laser writing circuit is provided with a laser driver (an LD driver). The laser driver outputs a driving pulses. The pulse width of each of the driving pulses is determined based on the density level data D0–D3, and the phase of each of the driving pulses is determined based on the phase data D4 and D5. A laser diode is driven by the driving pulses so as to emit a laser beam. The laser beam scans the surface of the photosensitive medium so that an electrostatic latent image is formed on the surface of the photosensitive medium.

According to the third embodiment of the present invention, the phase control process is carried out, in which process the observation dot is made be close to the next dot on the right or left side in accordance with the density level data of the observation dot and the next dots on the right and left sides. Thus, dots on edges of an image are made be close to dots in the image so that the edges of the image are made be smooth. In addition, as the phase control process is carried out by a hardware such as the latches, the comparators and logic circuit indicated in FIG. 15A, the phase control process can be carried out at a high speed. As the data generated by the phase controller 1300 is directly supplied to the laser printer unit 1400, a memory for temporarily storing the data generated by the phase controller 1300 is not needed.

Furthermore, the density level data of the observation dot and the next dots on the right and left sides are respectively compared with the low-density boundary level L and the high-density boundary level H, and it is determined, based on the comparison results, whether or not the phase control is performed. Thus, due to the control of the high-density boundary level H and the low-density boundary level L, the phase control can be applied to only the solid image and be not applied to the half tone image. That is, the quality of the half tone is prevented from deteriorating by the phase control. The high-density binary level H and the low-density binary level L are determined based on the state (the gamma characteristic) of processes performed in the laser printer unit. Thus, a high-quality image can be formed by the laser printer unit 1400.

The present invention is not limited to the aforementioned embodiments, and variations an modifications may be made without departing from the scope of the claimed invention.

What is claimed is:

1. An apparatus for processing a dot image of a plurality of dots, each dot having a density level, said apparatus comprising:

extraction means for extracting from said dot image a dot pattern including an observation dot and dots surrounding said observation dot;

dropout dot determination means for determining whether the dot pattern extracted by said extracting means corresponds to at least one of first reference patterns, wherein it is determined that the observation dot having a black density level is a dropout dot which should have a white density level in an edge portion of the dot image when said dropout dot determination means determines that the dot pattern corresponds to at least one of said first reference patterns;

projection dot determination means for determining whether the dot pattern extracted by said extracting means corresponds to at least one of second reference patterns, wherein it is determined that the observation dot is a projection dot which should have the black density level in an edge portion of the dot image when said projection dot determination means determines that the dot pattern corresponds to at least one of said second reference patterns, dots of each of the second reference patterns and dots of one of the first reference patterns being symmetrically arranged with respect to a point, density levels of dots of each of the second reference patterns being in inverse relation to density levels of corresponding dots of one of the first reference patterns; and means for changing a density level of the observation dot to the white density level when it is determined that the observation dot is the dropout dot, and for changing a density level of the observation dot to the black density level when it is determined that the observation dot is the projection dot.

2. The apparatus as claimed in claim 1, wherein each of the first reference patterns is formed of more than a predetermined number of dots, having the black density level or the white density level, which are sequentially arranged in a main scanning direction or a sub scanning direction parallel to the main scanning direction.

* * * * *